A. W. MYERS.
TRAP.
APPLICATION FILED MAY 25, 1908.
953,636.
Patented Mar. 29, 1910.
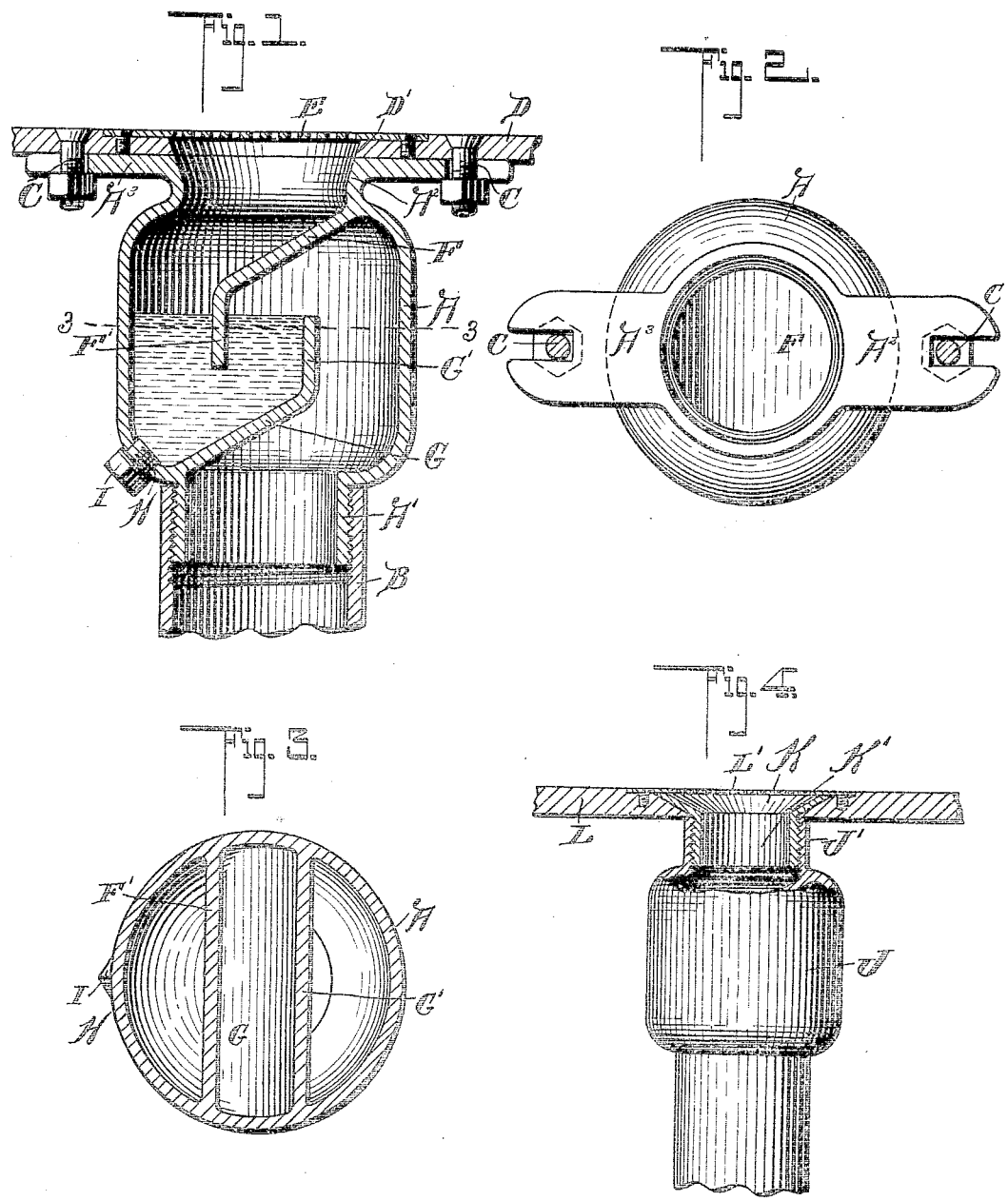
Witnesses
Philip H. Burch
L. M. Brooke
Inventor
A. W. Myers,
By
Attorneys

UNITED STATES PATENT OFFICE.

ALBERT WALTER MYERS, OF GRANITE CITY, ILLINOIS.

TRAP.

953,636.  Specification of Letters Patent. Patented Mar. 29, 1910.

Application filed May 25, 1908. Serial No. 434,823.

*To all whom it may concern:*

Be it known that I, ALBERT W. MYERS, a citizen of the United States, residing at Granite City, in the county of Madison and State of Illinois, have invented a new and useful Improvement in a Trap, of which the following is a specification.

This invention relates to traps especially adapted to be used in connection with sinks, the object being to provide very novel means connecting the trap to the sink.

A further object of my invention is to provide the trap with a drain opening, whereby it can be readily cleaned when desired.

Another object of my invention is to provide a trap which is formed of a single body which is so constructed that it can be readily connected to a sink and drain pipe.

With these objects in view, the invention consists in the novel features of construction, combination and arrangement of parts, hereinafter fully described and pointed out in the claim.

In the drawings forming a part of this specification:—Figure 1 is a vertical sectional view through my improved trap, and a portion of a sink and drain-pipe. Fig. 2 is a top plan view of my improved trap showing the supporting bolt in section. Fig. 3 is a section taken on line 3—3 of Fig. 1. Fig. 4 is a side elevational view partly broken away showing a modified form.

In the drawings A indicates the body of my improved trap which is provided with a threaded neck A', over which is adapted to be secured a drain-pipe B. The trap is provided with a flanged neck $A^2$ having oppositely disposed outwardly projecting arms $A^3$ provided with bifurcated ends through which bolts C are adapted to extend for securing it to the underside of the sink D under the drain-opening D' which is provided with the ordinary strainer E.

Extending inwardly from opposite sides of the body are inclined partitions F and G provided with angled ends F', G' which extend slightly beyond the center of the body, the partition G forming a trap proper, in which a certain amount of water is retained at all times so as to form a water seal. The side of the body adjacent the partition G is provided with a threaded bore H adapted to be closed by a plug I, so that the trap can be readily cleaned when desired.

In the modification shown in Fig. 4, the body J is provided with an internally threaded neck J' adapted to be secured over the externally threaded spout K' of a funnel-shaped member K which is secured in an opening having beveled walls formed in the sink L and over which is secured the ordinary strainer L'.

From the foregoing description it will be seen that I have provided a trap which can readily be molded and one which is exceedingly simple and cheap in construction.

Having thus fully described my invention, what I claim as new and desire to secure by Letters Patent is:—

As a new article of manufacture, a trap comprising a body provided with a flanged upper neck having oppositely disposed bifurcated arms for attaching it to the under side of a sink said body being provided with a threaded lower neck for connecting it to a drain pipe, inclined partitions extending inwardly from opposite sides of the body provided with angled vertical parallel ends, said partitions extending inwardly beyond the center of the body and the ends out of a horizontal alinement forming a trap proper, said body having a threaded bore slightly above the lower partition and a plug working in the bore whereby said trap can be quickly cleaned.

ALBERT WALTER MYERS.

Witnesses:
HENRY G. BRANDES,
ALLEN F. BYRD.